O. H. HIATT.
CHOKER HOOK.
APPLICATION FILED JULY 28, 1914.
1,219,942.
Patented Mar. 20, 1917.
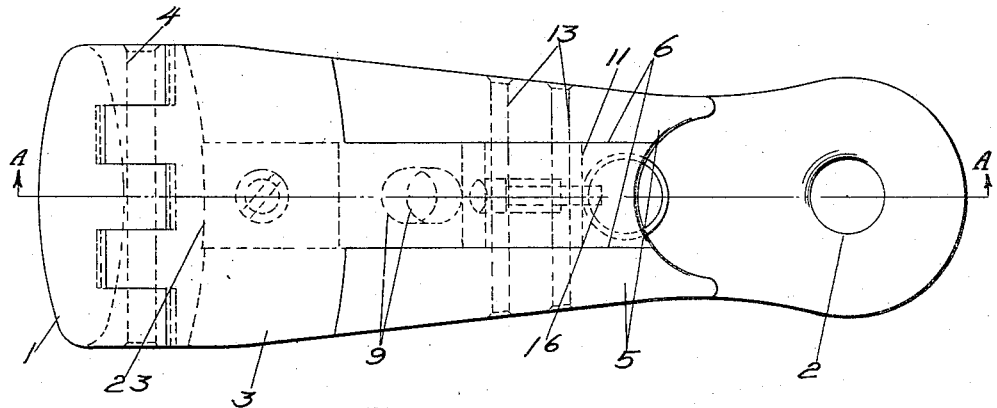
Fig.1
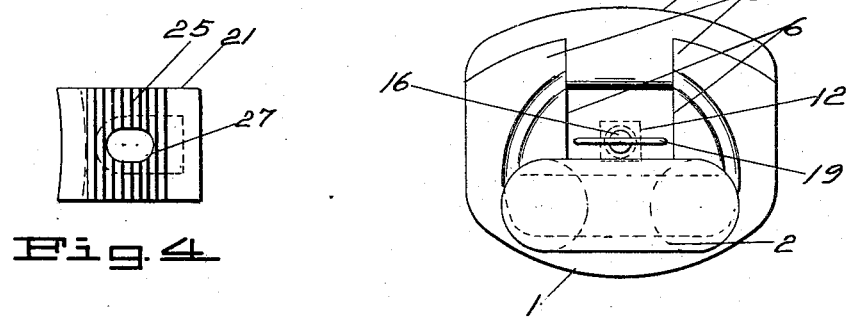
Fig.4
Fig.2
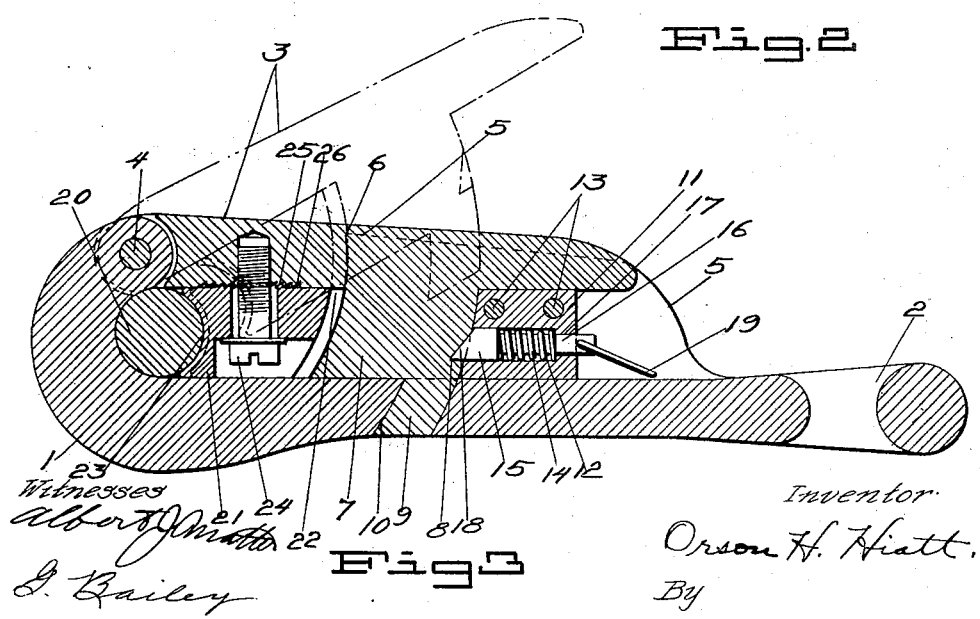
Fig.3
Witnesses
Albert J. Smith
J. Bailey
Inventor
Orson H. Hiatt,
By
J. H. Mock.
Attorney

UNITED STATES PATENT OFFICE.

ORSON H. HIATT, OF PORTLAND, OREGON, ASSIGNOR OF ONE-HALF TO J. C. WILLIAMS, OF PORTLAND, OREGON.

CHOKER-HOOK.

1,219,942.   Specification of Letters Patent.   Patented Mar. 20, 1917.

Application filed July 28, 1914. Serial No. 853,585.

*To all whom it may concern:*

Be it known that I, ORSON H. HIATT, a citizen of the United States, residing at Portland, in the county of Multnomah and State of Oregon, have invented certain new and useful Improvements in Choker-Hooks, of which the following is a specification.

This invention relates to improvements in choker hooks and has for its object to provide a hook having an adjustable choker block and simple and effective locking mechanism for maintaining the hook in closed position.

I attain this object by means of the improvements illustrated in the accompanying drawings in which:—

Figure 1 is a top plan view of the complete hook.

Fig. 2 is an end view of the subject matter shown in Fig. 1.

Fig. 3 is a sectional elevation of the hook taken on the line A—A of Fig. 1.

Fig. 4 is a detail top plan view of the choker block.

Referring to the drawings, 1 designates the main hook member which is provided with the usual eye 2, the hook end terminating in a hinge bearing in which a hinged member 3 is pivotally mounted by means of a hinge pin 4.

The hook member 1 is provided with upcast side flanges 5 forming a groove 6 between them. The side flanges extend from a point near the eye 2 to a point slightly distant from the hinge bearings at which end they are formed upon a circular curve 6 coaxial with the center of the pin 4.

The hinged member 3 is formed to complete the regular contour of the hook and so as to fit within the groove 6 and between the curved ends 6 of the flanges and the hinge end of the hook.

A projection 7 having a lock pin recess 8 is formed on the under side of and is integral with the hinged member 3 and is also provided with a reinforcing pin 9 adapted to fit within an orifice 10 provided in member 1, the pin 9 and its orifice 10 being curved and concentric with the center of pin 4 so that the pin 9 will readily enter and fill the orifice 10 for the purpose of reinforcement. It is desirable that the pin 9 pass entirely through the member 1 so as to clear out anything that may tend to clog the orifice 10.

A lock-block 11 having a squared lock-pin recess 12 is secured within the groove 6 by means of pins 13.

A coil spring 14 is held within the recess 12 and a square lock pin 15 having a reduced shank 16 is slidably mounted within the recess 12 so that the shank 16 passes through the spring and through an orifice 17 provided in the block as shown.

The squared end of the lock-pin 15 is beveled as at 18 so as to fit within the recess 8 within which it is held by the spring 14. To limit the outward movement of the lock-pin when unlatched and to provide a finger-hold for unlatching it a ring $1^a$ is attached to the end of shank 16.

To firmly hold a line within the hook as at 20 a choker-block is provided.

The choker-block is made to fit within a recess 22 formed in the extension 7 of member 3 and has a concave end 23 adapted to engage and grip the line 20 when the member 3 is in locked position. The choker block is held within the recess 22 by means of a screw 24 which passes through an orifice 27 provided in said block and for the purpose of lateral adjustment it is provided with a toothed upper surface 25 adapted to engage a similarly toothed surface 26 provided within the recess 22.

In operation the hinged member 3 is unlatched and opened and the line 20 then dropped into position as shown in Fig. 3 whereupon the hinged member 3 is closed and locked in place. For use with larger or smaller lines the block 21 may be adjusted as desired.

What is claimed is:—

1. A choker hook of the character referred to, comprising a hook member, a member hinged to the hooked end thereof and adapted to close upon said hook member, whereby to leave a receiving opening therebetween, means for holding said hinged member closed, and a choker block detachably secured within said receiving opening, whereby to regulate the size of said receiving opening.

2. A choker hook of the character referred to, comprising a hook member, a member hinged to the hooked end thereof and adapted to close upon said hook member, whereby to leave a receiving opening therebetween, means for holding said hinged member closed, and a choker block adjustably mounted within said receiving opening, whereby to regulate the size of said opening.

3. A choker hook of the character referred to, comprising a hook member provided with an eyelet at one end and a hinged member at its hooked end adapted to close into interfitting engagement with said hook member, whereby to form a receiving opening therebetween, means for locking said hinged member closed, and a choker block adjustably secured to said hinged member, within said receiving opening, whereby to regulate the size of said receiving opening, substantially as described.

4. A choker hook of the character described, comprising a hook member, a member hingedly secured to the hook portion thereof and having a curved projection adapted to close into interfitting connection with said hook member, whereby to leave a receiving opening between said hook member and said hinged member, spring-actuated means for locking said hinged member into closed position, a choker block adapted to fit within said receiving opening, to form one side thereof, and means for adjustably securing it to said hinged member, substantially as described.

5. A choker hook of the character referred to, comprising in combination, a hook member having an eyelet at one end, a hook at its other end and flanges at its sides for a portion of its length, a member hinged to said hook member and adapted to close between said flanges, said member having a curved projection adapted to close into interfitting engagement with said hook member between its flanges, a spring-actuated lock-pin for holding said hinged member closed, and a choker block adjustably secured to said hinged member adjacent its hinged end, whereby to form one side of a receiving opening in said hook member, substantially as described.

In testimony whereof I affix my signature in the presence of two witnesses.

ORSON H. HIATT.

Witnesses:
  V. E. HOLSTON,
  N. J. ENGLISH.

Copies of this patent may be obtained for five cents each, by addressing the "Commissioner of Patents, Washington, D. C."